United States Patent [19]

Lee

[11] Patent Number: 5,284,542
[45] Date of Patent: Feb. 8, 1994

[54] COVERING PANEL MAKING PROCESS

[76] Inventor: Leif Lee, No. 5-5, San Yuan Village, Chung Chuang Tsun, Ta An Hsiang, Taichung Hsien, Taiwan

[21] Appl. No.: 22

[22] Filed: Jan. 4, 1993

[51] Int. Cl.⁵ .............................................. B32B 31/06
[52] U.S. Cl. .................................... 156/242; 156/245; 156/250; 156/256; 156/267; 156/306.6; 156/313; 190/21; 190/23; 190/40; 190/124; 190/125; 190/127
[58] Field of Search ............... 156/242, 245, 250, 256, 156/267, 306.6, 313; 190/21, 23, 40, 124, 125, 127

[56] References Cited

U.S. PATENT DOCUMENTS

| 5,004,091 | 4/1991 | Natho et al. | 190/40 |
| 5,065,847 | 11/1991 | Hsieh | 190/40 |
| 5,219,075 | 6/1993 | White | 190/124 |
| 5,228,546 | 7/1993 | Chang et al. | 190/127 |

Primary Examiner—Caleb Weston
Attorney, Agent, or Firm—Bacon & Thomas

[57] ABSTRACT

A process is disclosed for making a covering panel for a portable case, the process including a step of bonding a lining and a sheet of foamed EVA by an adhesive agent then cutting it into base panels according to the desired sizes, a step of bonding a face layer to each base panel by a layer of polyethylene through the process of heating and pressing and then punching each panel into the desired shape.

1 Claim, 7 Drawing Sheets

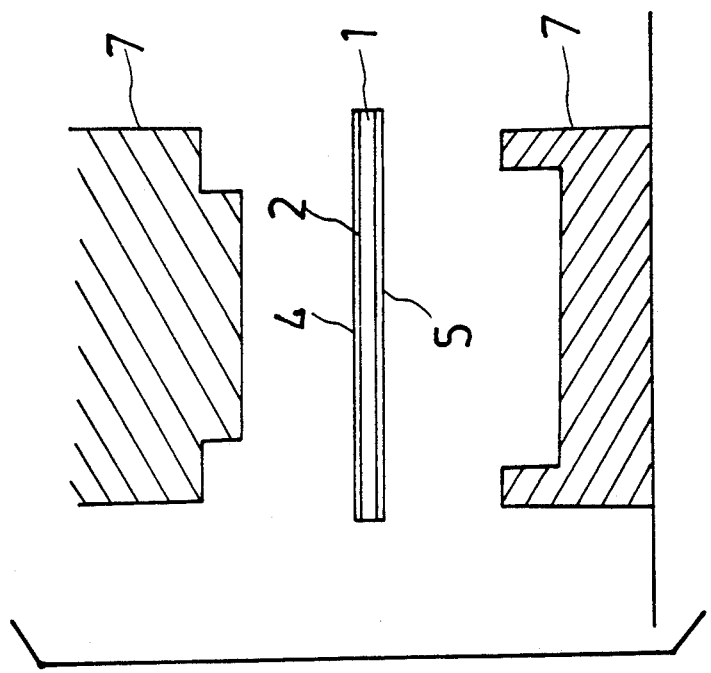

COVERING PANEL MAKING PROCESS

BACKGROUND OF THE INVENTION

The present invention relates to a covering panel making process, and relates more particularly to a process for making covering panels for portable apparatus cases.

A portable apparatus (racket, mobile computer, music instrument, etc.) is generally sold with a case or bag for carrying. FIGS. 1 and 2 illustrate an apparatus carrying case for this purpose. The covering panels of this type of apparatus carrying cases are commonly made of a synthetic leather attached with a lining and then stretched over a frame and fastened by stitching. This covering panel making process is complicated and laborious. Further, a covering panel made according to this making process is flimsy, and therefore an apparatus carrying case of this type is not durable in use.

Further, various foamed plastics and rubber have been proposed and used for making a variety of products. For example, foamed EVA(Ethylene Vinyl Acetate) has been widely used as a sheet material for making a variety of products to replace regular synthetic leathers. When a foamed EVA is used for making a covering panel for an apparatus carrying case, it must be covered with a face layer. According to conventional methods, an adhesive agent is commonly used to bond a face panel to a foamed EVA. This bonding process can not eliminate the occurrence of air bubbles, and therefore the face panel may drop from the foamed EVA easily.

SUMMARY OF THE INVENTION

The present invention has been accomplished under the aforesaid circumstances. The present invention provides a process for making a covering panel for a portable case, which includes a step of bonding a lining and a sheet of foamed EVA by an adhesive agent then cutting it into base panels according to the desired sizes, a step of bonding a face layer to each base panel by a layer of polyethylene through the process of heating and pressing and then punching each panel into the desired shape. Because the base panel was cut according to the desired size and the layer of polyethylene can be melted within 110° C.–120° C., the bonding process of the face layer to the base panel can be quickly done by a small, inexpensive hydraulic press. Because the face layer and the base panel are fastened together by melting the layer of polyethylene, no bubbles will be produced between the face layer and the base panel. Because the covering panel is shape formed through punching, stitching process is eliminated.

BRIEF DESCRIPTION OF THE DRAWINGS

FIGS. 9 and 10 illustrate the material panel put to a die and punched into a covering panel.

DETAILED DESCRIPTION OF THE PREFERRED EMBODIMENT

Figure 1:
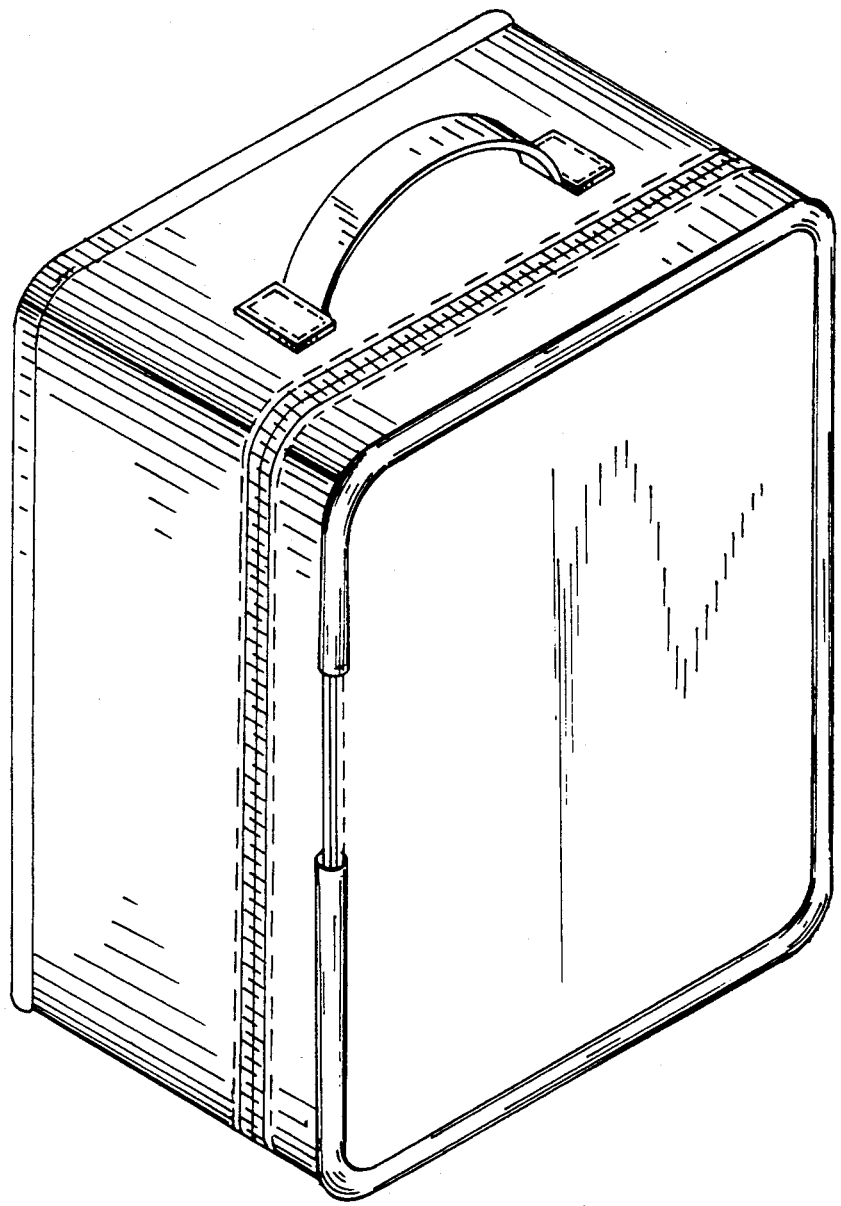
FIG. 1 is an elevational view of an apparatus carrying case according to the prior art.
Figure 2:
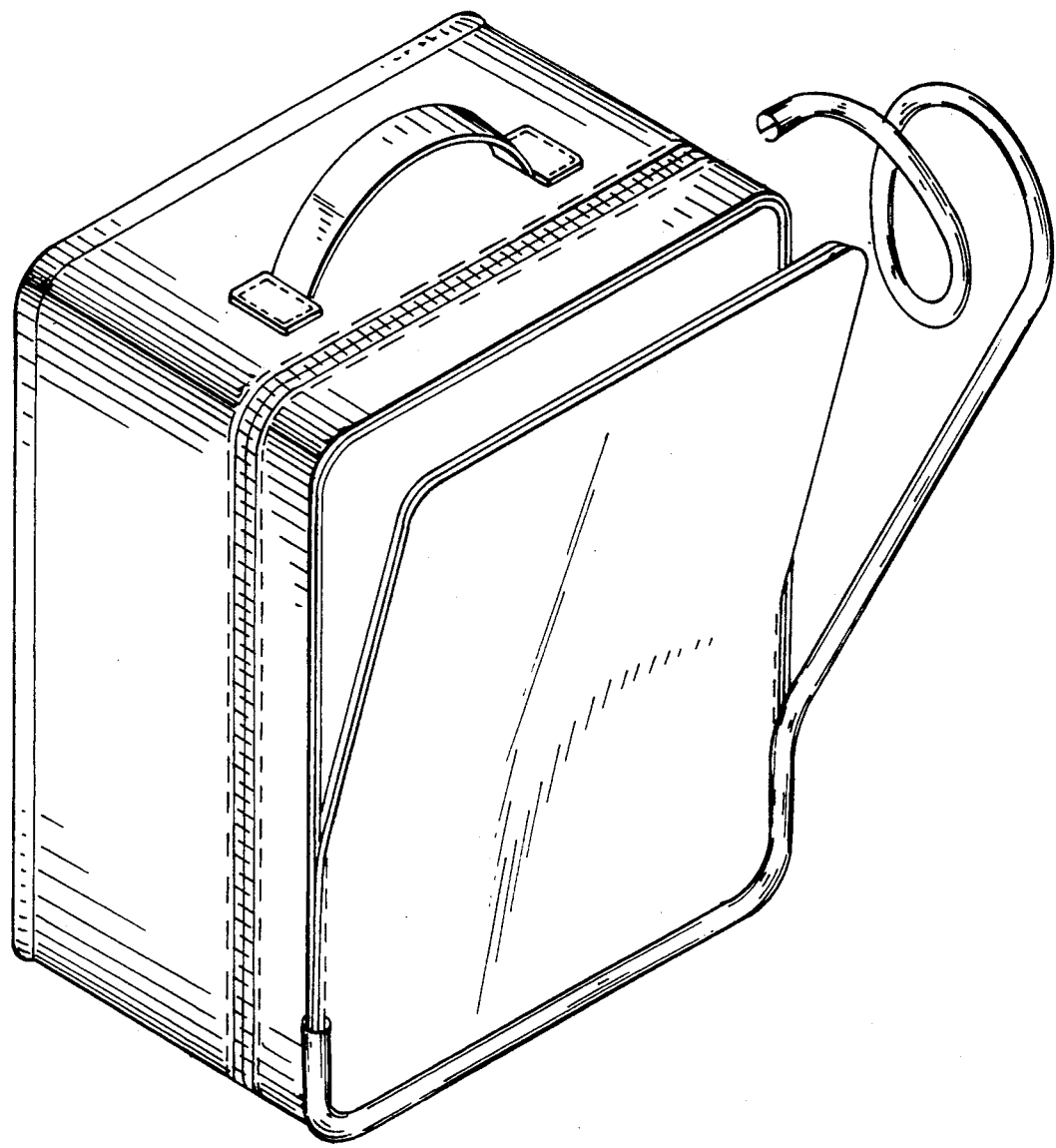
FIG. 2 is a split view of the covering panel of the apparatus carrying case of FIG. 1.
Figure 3:
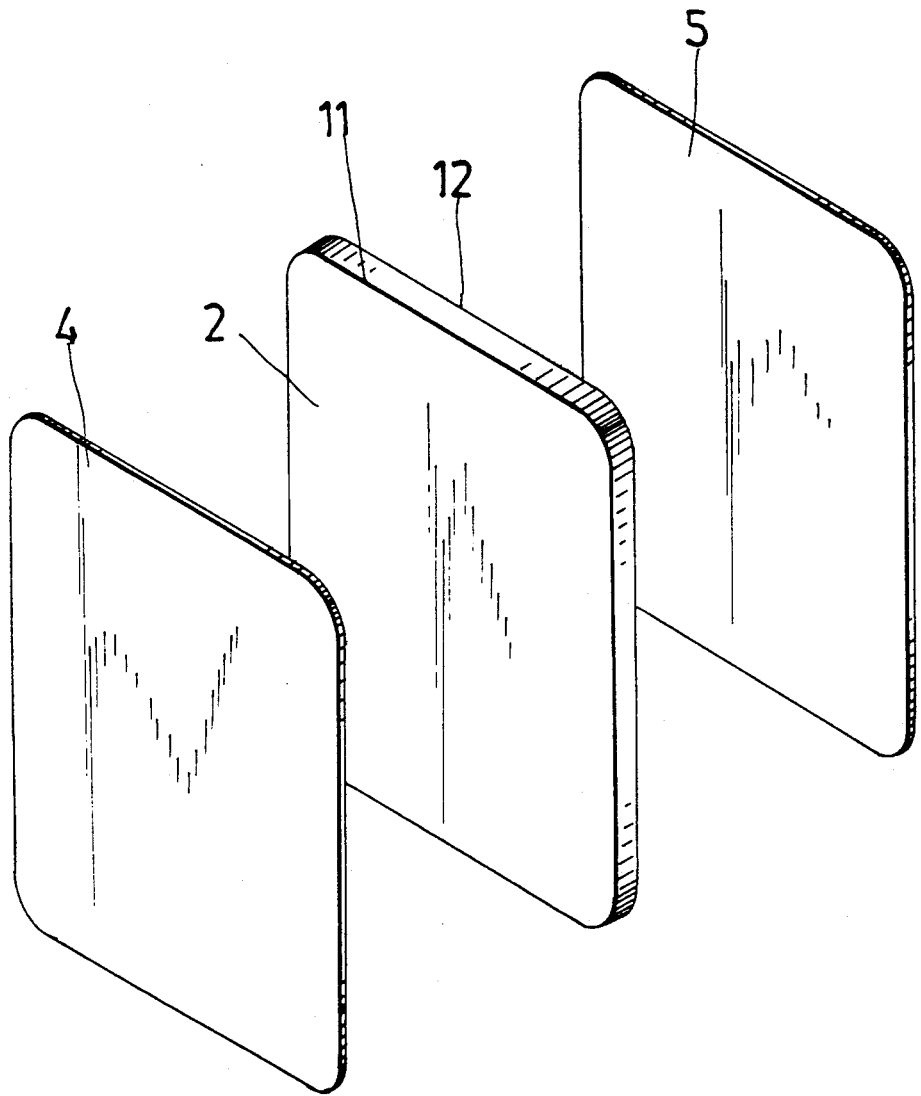
FIG. 3 is a fragmentary view of a covering panel according to the present invention.
Figure 4:
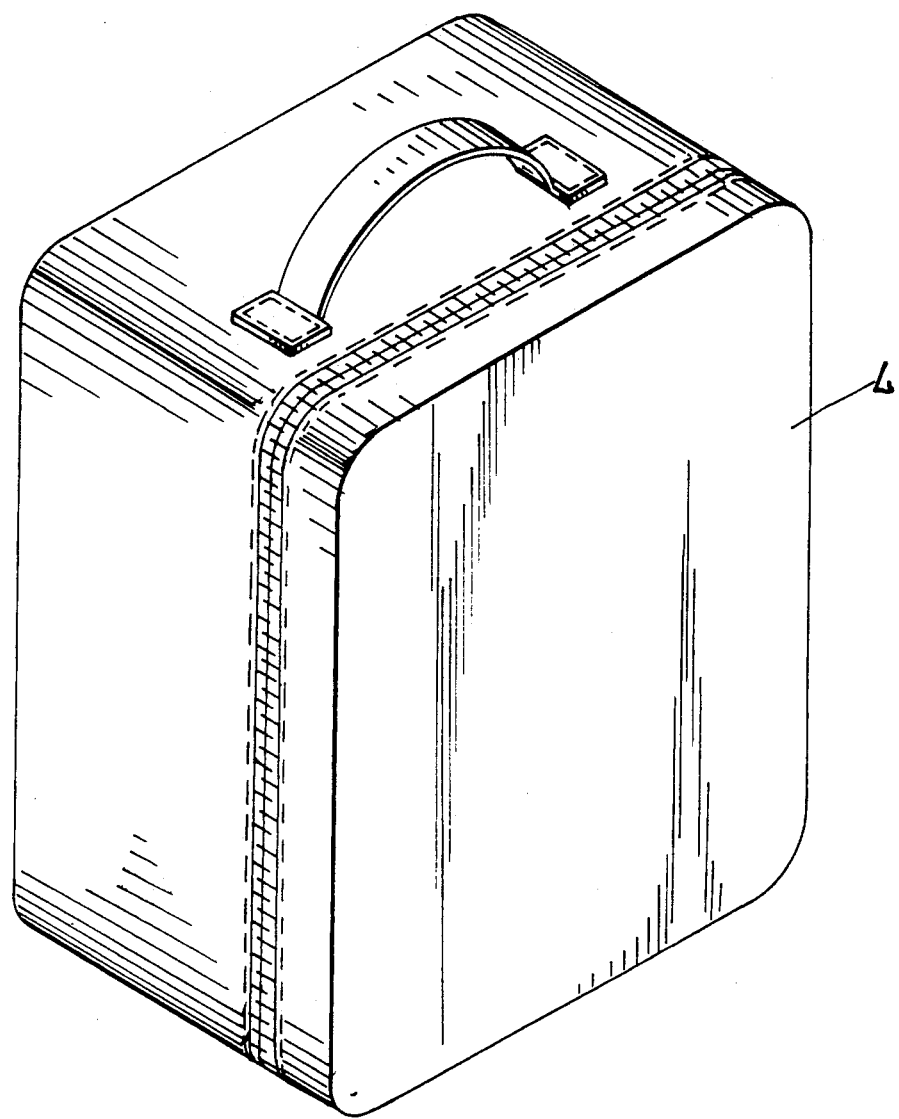
FIG. 4 is an elevational view of an apparatus carrying case according to the present invention.

Referring to FIGS. 3 and 4, a covering panel for an apparatus case made according to the present invention is intended for making bags, cases or the like for carrying apparatus, and generally comprised of a layer of foamed EVA 1, a face layer 4 covered on one side 11 of the layer of foamed EVA 1, a lining 5 covered on the opposite side 12 of the layer of foamed EVA 1, and a layer of polyethylene 2 covered between the layer of foamed EVA 1 and the face layer 4. The face layer 4 is preferably a polyurethane leather. The lining 5 is preferably a elastic fabric cloth.

Figure 6:
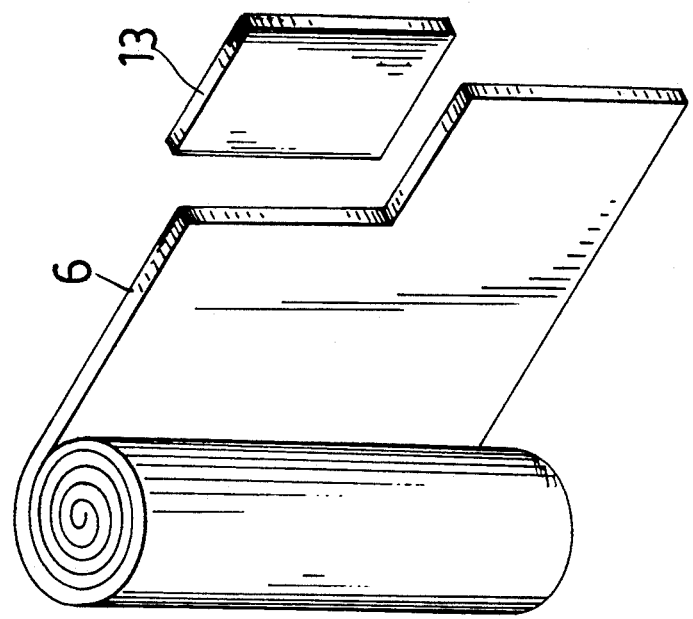
FIG. 6 illustrates a base panel cut from the base sheets.
Figure 5:
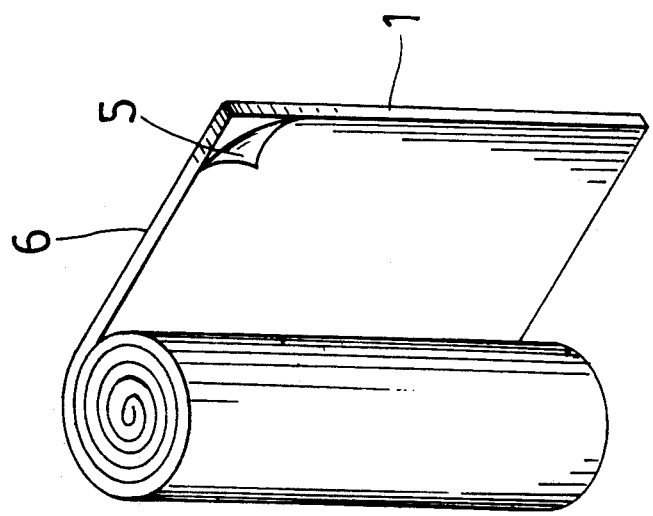
FIG. 5 illustrates a lining and a layer of foamed EVA bonded into a base sheet.
Figure 8:
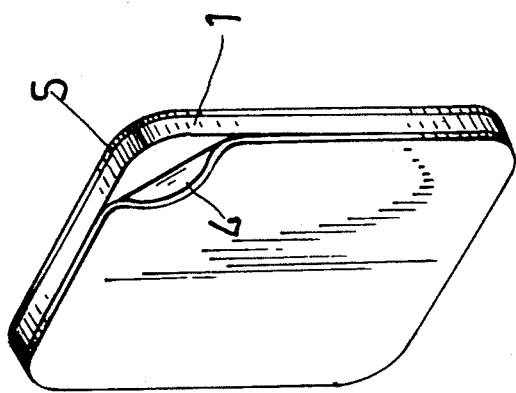
FIGS. 7 and 8 illustrate a layer of polyethylene and a lining are respectively covered on the base panel.
Figure 7:
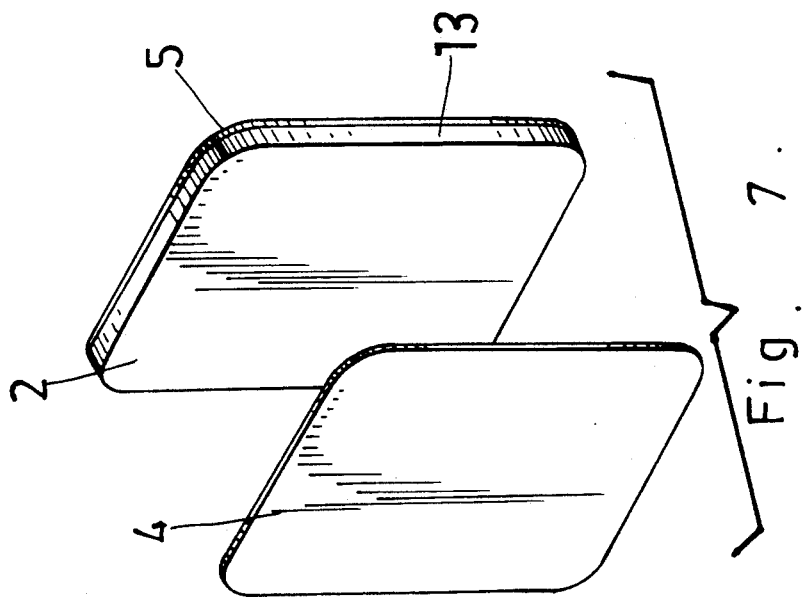

Referring to FIGS. 5, 6 and 7, a lining 5 and a layer of foamed EVA 1 are respectively coated with an adhesive agent and then adhered together and formed into a base sheet 6. The base sheet 6 is then properly cut into a sizes. Then, place a layer of polyethylene 2 over the base panel 13 and a face layer 4 over the layer of polyethylene 2, and then put them to a hydraulic press for pressing and heating under temperature 120° C. and pressure 20 KGs per square inch for about 15 seconds for permitting the layer of polyethylene 2 to be melted to bond the base panel 13 and the face layer 4 into a material panel. into a material panel. The material panel thus obtained is put in a die 7 before cooling, and then pressed into a covering panel according to the desired shape. When finished, the shaped covering panel is properly trimmed to remove the burrs.

claim:

1. A process for making a covering panel comprised of a layer of foamed EVA covered with a face layer and a lining on two opposite sides thereof and a layer of polyethylene between said layer of foamed EVA and said face layer, the method comprising steps of:
    a) preparing a base sheet by adhering a lining to one side of a sheet of foamed EVA by an adhesive agent, then cutting the base sheet thus obtained into base panels having the desired sizes;
    b) placing a layer of polyethylene over each base panel, on a side opposite to said lining, and a face layer over the layer of polyethylene and then putting said panel, polethylene layer and face layer in a hydraulic press for pressing and heating under a temperature of 120° C. and a pressure of 20 KGs per square inch for about 15 seconds for permitting the layer of polyethylene to be melted to bond the respective base panel and the respective face layer into a respective material panel;
    c) before cooling, putting the material panel thus obtained from step b) in a die, and then pressing it into the desired shape, and then trimming the shaped material panel to remove burrs.

* * * * *